(No Model.)
G. E. WHITNEY.
BICYCLE BRAKE.
No. 527,571.  Patented Oct. 16, 1894.
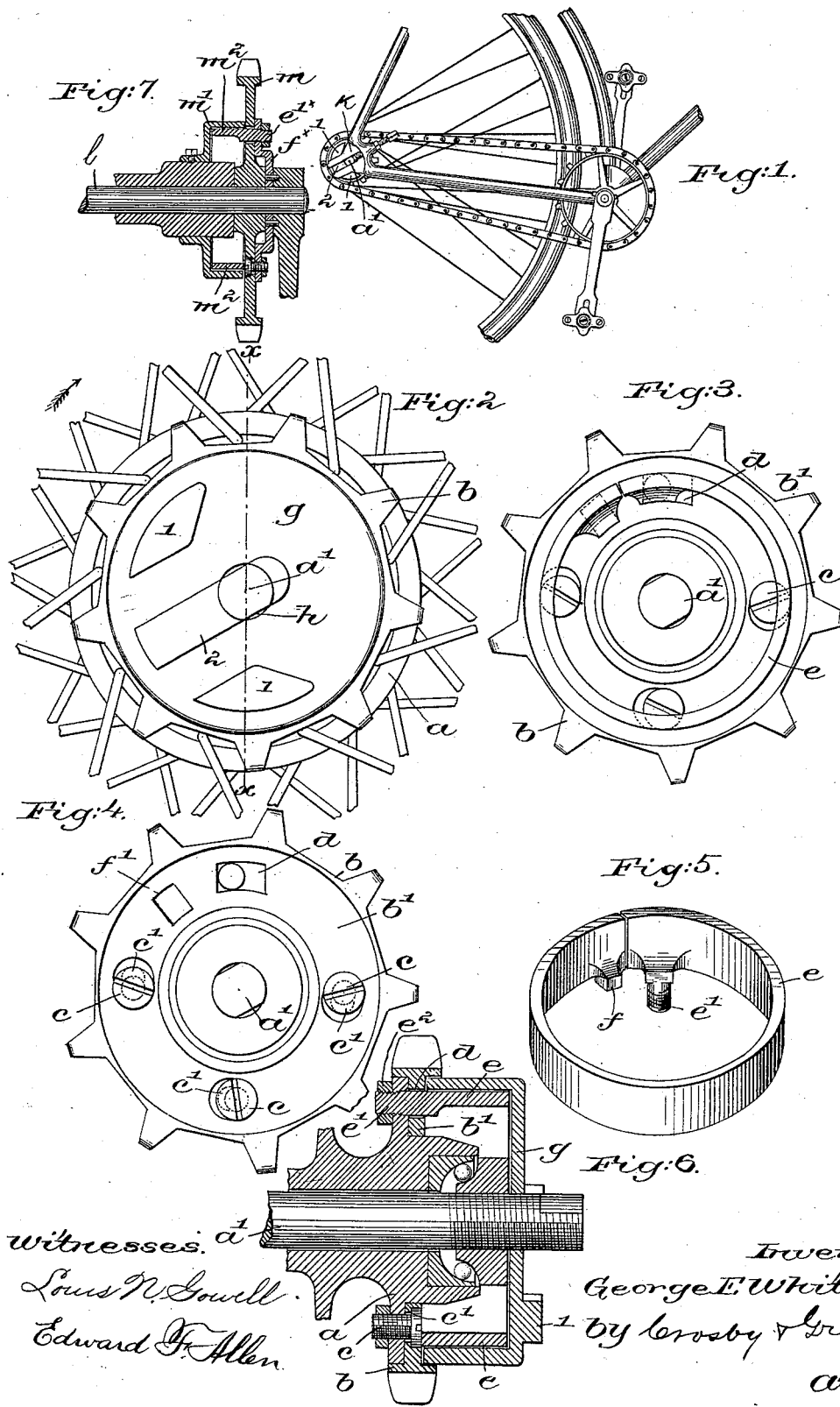

UNITED STATES PATENT OFFICE.

GEORGE E. WHITNEY, OF BOSTON, MASSACHUSETTS.

BICYCLE-BRAKE.

SPECIFICATION forming part of Letters Patent No. 527,571, dated October 16, 1894.

Application filed October 3, 1892. Serial No. 447,646. (No model.)

*To all whom it may concern:*

Be it known that I, GEORGE E. WHITNEY, of Boston, county of Suffolk, State of Massachusetts, have invented an Improvement in Bicycle-Brakes, of which the following description, in connection with the accompanying drawings, is a specification, like letters and figures on the drawings representing like parts.

Bicycles as now commonly constructed are provided with various forms of brake devices, including usually as a part thereof a concave shoe adapted to be pressed against the periphery of the wheel tire. This class of brake in practice must be very carefully managed, and applied slowly and gradually, or the shoe will tear off small pieces of material from the tread surface of the rubber tire, and this tendency to tear or destroy the tire is greater with pneumatic than with common rubber tires, for the pneumatic tire is comparatively thin, and its rapid destruction necessitates frequent renewal, which is very expensive.

The destructive action of the brake now in vogue is so well understood that many riders remove the brake altogether, and rely upon their skill and quickness to stop suddenly when necessary.

In my studies to overcome the objectionable features of the class of brake referred to, I was obliged, because of the lightness of the stock in pneumatic tires, to use some other portion of the wheel upon which to apply resistance and effect the stopping of the wheel, and I devised for this purpose a brake to co-operate with a part of the hub of the wheel, said brake comprehending two surfaces, one of which may be made to clutch the other, the form in which I have herein chosen to embody my brake mechanism, consisting of a part rotating with the wheel and a part connected with or restrained from rotation by the frame. I have placed said movable part under the control of the rider through what may be designated slight "back pedaling," the movable part of the clutch by such action being pressed closely to the stationary part, whereas during "forward pedaling" said parts for the best results should not touch each other.

My invention therefore consists essentially in the combination in a bicycle or the like, of a brake composed of a stationary and a ring-like movable rotative member having separate ends, one member being concentric with and normally inoperative with relation to the other, with a pedal, and connections between it and said movable member to rotate it and also at times to move one of the ends thereof with relation to the other to effect the engagement of the two concentric brake members through back pressure on the pedals, substantially as will be described.

I wish it to be understood that, while I have shown my improved brake as applied to a bicycle, and have used the term bicycle throughout the specification and claims, I consider its application to tricycles or similar vehicles as coming clearly within the scope of my invention.

Figure 1, in side elevation, shows a portion of the frame and driving wheel of a bicycle, with my invention applied thereto. Fig. 2 is a detached view of the hub and sprocket wheel or gear with the inclosing stationary clutch member in position; Fig. 3, a similar view with said member removed to show the movable clutch member of the brake; Fig. 4, a detail in side elevation showing the hub of the wheel with the sprocket wheel or gear attached thereto. Fig. 5 is a perspective view of the movable member constituting a part of the brake. Fig. 6, is a section taken on the line $x$—$x$, Fig. 2. Fig. 7 is a modification to be described.

I have herein shown my invention applied to a bicycle of the so-called "safety" type, in which the driving wheel is actuated by a link or other suitable belt engaging usual gears on the pedal shaft and driving wheel respectively, but this invention is not limited to the use of a link or chain between the pedal shaft and the wheel hub, as instead I may employ any other usual equivalent connections.

In the form in which I have chosen to illustrate my invention in Figs. 1 to 6, the hub $a$ of the driving wheel has a sprocket wheel or gear $b$ attached thereto loosely, the connection shown being by suitable screws $c$, the shanks of which pass through slots $c'$, see dotted lines Fig. 4, in the web $b'$ of said gear and into the face of the wheel hub, such slots enabling the gear to have a slight movement relative to the hub, the screw heads preferably resting in countersunk portions of the web $b'$.

As best shown in Fig. 4, I have provided the web with a slot $d$, through which is extended a threaded shank $e'$ see Figs. 5 and 6 attached to or forming part of a split ring or band $e$, constituting the rotative or moving clutch member, shown separately in Fig. 5, the said shank extending through the slot into the hub $a$, and being secured, as herein shown, by a nut $e^2$. See Fig. 6. When the nut is screwed up snugly, one end of the ring $e$ will be rigidly secured to the hub, see Figs. 3 and 6, the said gear being free to move slightly with relation to the ring and hub by reason of the slots $c'$ and $d$. The other end of the ring $e$ is connected with and to be moved by the gear, and I have herein shown a lug or ear $f$ projecting from the ring and adapted to enter a hole or recess $f'$ in the gear, though it is obvious that any positive connection between the free end of the ring and the gear would come within the scope of my invention.

The stationary member $g$ of the clutch is represented in Figs. 2 and 6 as a cap or shell, the cap being held in position outside of the ring, as shown, there being normally a slight space between the adjacent surfaces of the cap and ring.

The cap or shell has an opening $h$ in its end for the reception of the usual axle $a'$, and suitable projections 1, 2, between which the forked end $k$ of the frame is extended, thereby preventing the cap from rotating.

In operation, the wheel being rotated in the direction of the arrow Fig. 2, the gear will be drawn into the position shown in Figs. 3 and 4, with relation to the hub, and the ring will be compressed, and so long as the power is applied or the pedaling is such as to turn the wheel in such forward direction, the ring will be maintained contracted and free from contact with the interior of said cap or shell. Whenever it is desired to apply the brake, however, a slight back pressure, sometimes back-pedaling, is put upon the pedals, acting as a drag upon the forward movement of the gear $b$, which will slip with relation to the hub, the latter being carried forward by its momentum, and the two ends of the ring will be separated, it being remembered that one end thereof is attached to the hub and the other to the gear. This expansion of the ring will force it into contact with the inner surface of the stationary member $g$, to thereby constitute a friction clutch, which will act at once as a brake upon the wheel. The friction will be regulated by the amount of back-pressure exerted upon the gear through the pedals, as described. It will be seen that by the use of a friction clutch brake, as herein described, the operation of the same is entirely under the control of the rider at all times and through the pedals, so that the brake can be applied instantaneously and with any required degree of force, without any change of position on the part of the rider. The movable member $e$ is normally contracted by its own elasticity, so that it is never expanded unless by a retrograde movement of the gear with relation to the hub, but in addition to its own contractile force it is positively maintained contracted during the forward rotation of the gear in running, as described. The stationary member $g$ not only serves as one member of the clutch, but as a dust cap for the other parts of the clutch and the wheel bearing.

This invention is not limited to the movable member working expansively against the interior of the stationary member, for the converse, viz:—the movable member to grasp externally the stationary member concentric to the center of rotation of the wheel, or it might be of the pedal shaft, comes within the scope of this invention.

In Fig. 7 I have shown in section a modification of my invention in which the brake mechanism is made to co-operate directly with the pedal shaft, the pedal shaft $l$ having a gear $m$ loose thereon between the shaft bearing and the pedal crank, the stationary member $m'$ of the brake similar to the member $g$, being fixed to a part of the frame-work. The movable member $m^2$ is attached at one end to the gear and by a threaded shank $e'^x$, see Fig. 7 at the other end to a flange $f^x$ rotating with the shaft, and is similar to ring $e$, the shank $e'^x$ corresponding to the shank $e'$ of said ring $e$ said flange and gear being connected by a series of slots and pins, similar to the connection shown in Figs. 2 and 3, whereby the gear has a slight movement relative to the flange. Back pressure upon the pedal will tend to retard the shaft and flange, the gear moving ahead by its momentum, and the movable member $m^2$ is expanded to contact with the stationary member $m'$ and act as a brake upon the shaft.

Having described my invention, what I claim as new, and desire to secure by Letters Patent, is—

1. In a bicycle, the following instrumentalities, viz:—a pedal shaft; pedals to rotate it, a wheel axle, a drive wheel thereon; a clutch brake composed of a stationary member having a cylindrical friction surface, and a ring like rotative movable member having separated ends and normally out of contact with the cylindrical friction surface of said stationary member; one of said members inclosing the other and connections between said pedal shaft and the hub of said drive wheel to rotate the drive wheel and ring-like member in its forward direction and adapted by back-pedaling or pressure as described to move the ends of the ring like member with relation to each other and thereby effect the pressing together of said concentric members, to operate as a friction brake, substantially as described.

2. In a bicycle or the like, a brake composed of a stationary and a ring-like movable rotative member having separated ends, one member being concentric with and normally inoperative with relation to the other, combined with a pedal, and connections between it and said movable member to rotate it and also at times to move one of the ends thereof with relation to the other to effect the engagement of the two concentric brake members through back pressure on the pedals, substantially as described.

3. In a bicycle or the like, a brake composed of a stationary member, and a movable rotative member consisting of a split ring, one member being concentric with the other, combined with a pedal, and connections between it and the movable member to rotate it and also to move it into abnormal position to effect its engagement with the stationary member by back pressure on the pedal, substantially as described.

4. In a bicycle or the like, a rotatable hub, a brake composed of a stationary member, and a movable member consisting of an expansible ring secured at or near one end to said hub, combined with a pedal, connections between it and the other end of the movable brake member to normally rotate it and the hub, and also to move the ends of the ring with relation to each other to effect its engagement with the stationary member by back pressure upon the pedal, substantially as described.

5. In a bicycle, a cylindrical brake surface fixed with relation to the frame-work, a co-operating rotative split ring normally out of contact and concentric with the said stationary surface, a gear mounted loosely upon its shaft to permit a slight retrograde movement and secured to one end of and to rotate said split ring, rigid connections between said shaft and the other end of said split ring, a pedal shaft, and pedals, and devices intermediate the pedal shaft and gear to retard or retrograde said gear upon its shaft when the brake is to be applied, to thereby move one end and change the size of said split ring and press it into abnormal position against the stationary cylindrical member, substantially as described.

In testimony whereof I have signed my name to this specification in the presence of two subscribing witnesses.

GEORGE E. WHITNEY.

Witnesses:
JOHN C. EDWARDS,
A. E. DEAN.